United States Patent

[11] 3,614,678

[72] Inventors William E. Engeler
Scotia;
Marvin Garfinkel, Schenectady, both of N.Y.

[21] Appl. No. 660,078
[22] Filed Aug. 11, 1967
[45] Patented Oct. 19, 1971
[73] Assignee General Electric Company

[54] ELECTROMECHANICAL FILTERS WITH INTEGRAL PIEZORESISTIVE OUTPUT AND METHODS OF MAKING SAME
27 Claims, 33 Drawing Figs.

[52] U.S. Cl. ........ 333/72, 333/30, 317/235, 332/31, 307/308
[51] Int. Cl. ........ H03h 9/00
[50] Field of Search ........ 333/71, 30, 72; 317/234, 235; 323/75, 43.5, 61, 66; 332/31; 148/33; 179/110; 310/8.5, 25; 307/308

[56] References Cited
UNITED STATES PATENTS

| | | | |
|---|---|---|---|
| 3,413,573 | 11/1968 | Nathanson et al. | 332/31 |
| 3,303,452 | 2/1967 | Booth | 338/5 |
| 3,200,354 | 8/1965 | White | 333/30 |
| 3,277,405 | 10/1966 | Persson | 333/71 |
| 3,215,568 | 11/1965 | Pfann | 148/33 |
| 3,416,042 | 10/1968 | Thomas et al. | 317/234 |
| 3,210,696 | 10/1965 | Philips | 333/70 R |
| 3,417,322 | 12/1968 | Fenner | 323/75 |
| 3,517,349 | 6/1970 | Engeler et al. | 333/72 |

*Primary Examiner*—Herman Karl Saalbach
*Assistant Examiner*—C. Baraff
*Attorneys*—Richard R. Brainard, Marvin Snyder, Paul A. Frank, Frank L. Neuhauser, Melvin M. Goldenberg and Oscar B. Waddell

ABSTRACT: An electromechanical filter in monolithic silicon integrated circuitry is formed with a resonator member bridging a cavity and having a strain-sensitive piezoresistive pickoff element formed therein. When the resonator member is driven electrostrictively, capacitively, electromagnetically, magnetostrictively or magnetically, an AC output signal is provided by the pickoff element at a frequency dependent upon the mechanical characteristics of the member. The filter is fabricated by burying a silicon nitride slab within an epitaxially formed crystal and thereafter first etching out a pair of regions to define the sides of the resonant member and next etching away the silicon nitride slab to form a cavity beneath the resonator member.

Inventors:
William E. Engeler;
Marvin Garfinkel,
by Marvin Snyder
Their Attorney.

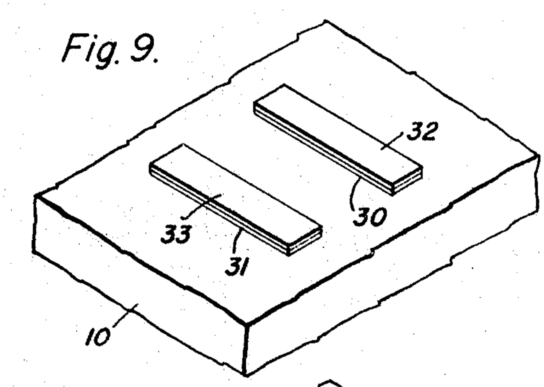
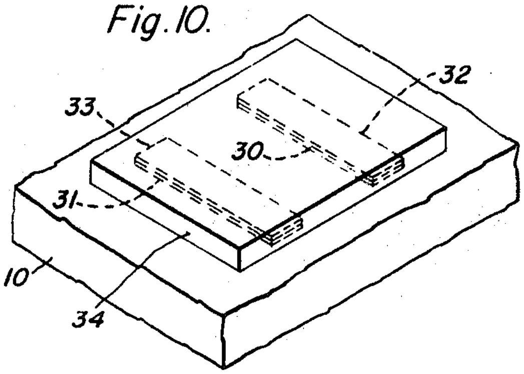
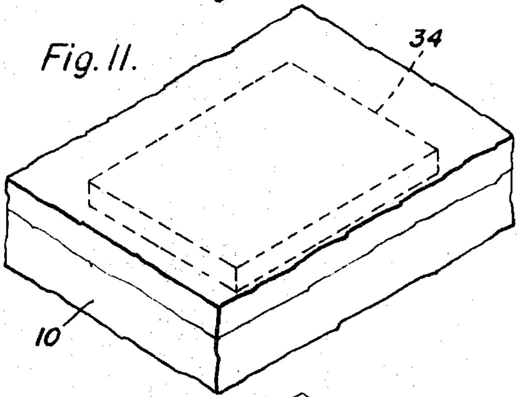
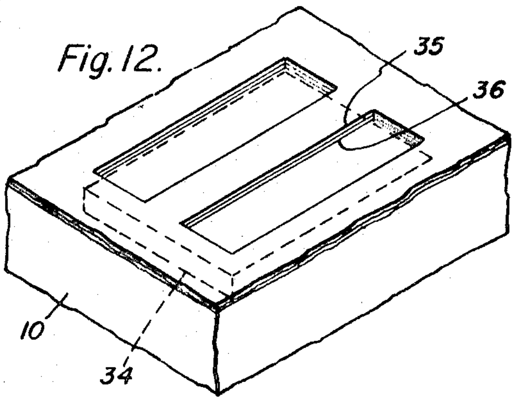
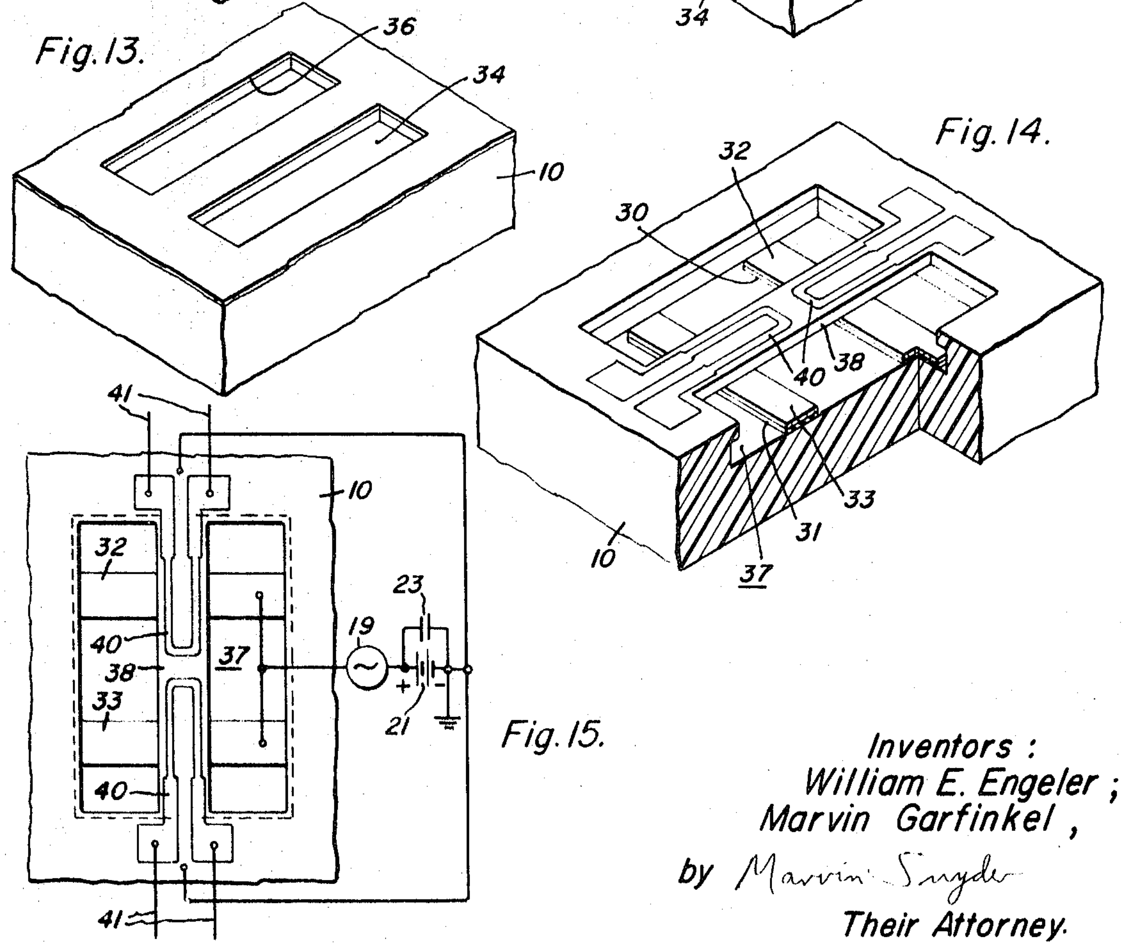
Fig. 9.
Fig. 10.
Fig. 11.
Fig. 12.
Fig. 13. Fig. 14. Fig. 15.
Inventors:
William E. Engeler;
Marvin Garfinkel,
by Marvin Snyder
Their Attorney.

Inventors:
William E. Engeler;
Marvin Garfinkel,
by Marvin Snyder
Their Attorney.

Inventors :
William E. Engeler ;
Marvin Garfinkel ,
by Marvin Snyder
Their Attorney.

Inventors:
William E. Engeler;
Marvin Garfinkel,
by Marvin Snyder
Their Attorney.

ELECTROMECHANICAL FILTERS WITH INTEGRAL PIEZORESISTIVE OUTPUT AND METHODS OF MAKING SAME

BACKGROUND OF THE INVENTION

This invention relates to filters, and more particularly to electromechanical filters compatible with monolithic semiconductor integrated circuitry and methods of fabricating such filters.

Electromechanical filters or resonators have generally been made of crystalline quartz cut so as to mechanically resonate when electrically driven at a mechanical resonance frequency. Although the figure of merit commonly designated Q, which represents a number proportional to the ratio of average energy stored to energy dissipated per cycle, is quite high for such resonators, they possess the disadvantages of being expensive, due to the high cost of crystalline quartz and its poor machinability. Devices of this type are also quite large and require special mounting. Moreover, the output of a quartz resonator or that of any other piezoelectric device loads the input. In addition, such devices are not compatible with monolithic silicon-integrated circuitry.

More recently, two other types of electromechanical filters have appeared. One type comprises a small metal flexor mounted on top of a silicon wafer and positioned above the gate region of a field-effect transistor so as to act as the gate electrode. The flexor beam is capacitively driven from the substrate, and its motion modulates a voltage at the gate of the field-effect transistor in order to modulate the field-effect transistor output signal. However, this device suffers from the defect that the output signal is nonlinear.

The second type of electromechanical filter which has recently appeared utilizes a flexing beam of silicon which is mounted on a substrate. The output of this device is piezoresistive, and is thus linear. The drive mechanism is thermal in that resistively generated heat expands appropriately chosen sections of the beam and, if the frequency is proper, the beam can be made to resonate. This second device is limited in operation to low frequencies.

In our copending application Ser. No. 660,076 filed concurrently herewith and assigned to the instant assignee, we describe and claim a discrete electromechanical filter having a resonator beam which is driven in the flexural mode by interaction of a constant magnetic field with AC current through a metallic layer deposited on an insulating layer overlying the beam. The resonator beam is alloy bonded to opposite sides of a cavity formed in a semiconductor or ceramic base. In our copending application Ser. No. 660,077 also filed concurrently herewith and assigned to the instant assignee, we describe and claim an electromechanical filter formed either in monolithic silicon or as a discrete element, having a cantilevered resonator which is moved through a magnetic field, with a strain-sensitive element integrally included in a support region of the cantilever for sensing strain therein.

By employing a resonator member integral with a semiconductor crystal, and by including both a strain-sensitive resistive element as output transducer means sensing strain in the resonator member and electrical means drivably coupled to the resonator member for furnishing mechanical energy thereto, an electromechanical filter may be fabricated without any of the aforementioned disadvantages; that is, the basic design is compatible with modern semiconductor technology and may thus be produced cheaply. The device is also compatible with monolithic silicon-integrated circuitry. Moreover, because the output signal is linear in resonator strain, there is no harmonic generation by the filter. The range of frequencies available by suitable choice of resonator geometry, mode of oscillation, and excited harmonic is very wide, ranging from $10^3$ Hz. $-10^9$ Hz. and thereby including both audio and video intermediate frequencies. Furthermore, the output circuitry is completely decoupled from the input and does not load the input circuitry at all; also, the output signal may be supplied at almost any impedance level desired. Because the output transducing means are integral with the oscillating member, all signal attenuation due to losses at resonator-transducer interfaces is eliminated.

In the device of the instant invention, electrical power supplied to the means for furnishing mechanical energy to the resonator does very little, unless the frequency of the electrical power falls within the pass band of the mechanical resonator. When the input frequency falls within the resonator pass band, a mechanical oscillation of the resonator builds up, with amplitude dependent upon input power and upon Q of the resonator. The resonant member, which thereupon resonates, has pass band frequencies determined by its geometrical shape and the elastic properties of the material of which it is comprised. The mode of oscillation and the harmonic which is excited are determined by the detailed method of excitation.

The electrical output signal may be obtained from a resistor diffused into a surface of the resonator. Placement of the diffused resistor is judiciously selected to maximize the output signal for the desired mode of oscillation and harmonic. As the resonator oscillates, resistance of the diffused resistor changes, producing an electrical output signal proportional to amplitude of strain in the resistor. Since the strain in the diffused resistor thus varies sinusoidally with time, an AC output signal is obtained. This signal may be maximized by situating the resistor at locations where maximum strain occurs and by selecting proper orientation of the resistor with respect to the crystallographic axes of the semiconductor. For uniaxial strain in silicon, the longitudinal axis of the diffused resistor should be along a <111> direction in the case of a P-type output resistor and along a <100> direction for an N-type resistor, resulting in gauge factors for low concentrations of impurities of approximately 180 and 130 respectively. "Gauge factor," as used herein, may be defined as the ratio of the net fractional change in resistivity of the diffused resistor utilized as a sensor, caused by uniform strain in the flexor member, to the uniform strain of the flexor member.

BRIEF SUMMARY OF THE INVENTION

Briefly, in accordance with a preferred embodiment on the invention, an electromechanical filter compatible with monolithic integrated circuitry is provided. This filter comprises a semiconductor crystal having a cavity formed therein and resonator means being integral with the crystal and bridging the cavity. Means are drivably coupled to the resonator means for furnishing mechanical energy to the resonator means, and piezoresistive output means integral with said resonator means and responsive to oscillation of said resonator means and responsive to oscillation of said resonator means are provided for producing a signal of amplitude and frequency proportional respectively to the amplitude and frequency of oscillation of the resonator means.

In another preferred embodiment of the invention, a method of forming an electromechanical filter in a silicon crystal of one conductivity type is provided This method comprises depositing a layer of silicon nitride over a portion of one surface of the crystal, and epitaxially growing silicon of the one conductivity type on the one surface of the crystal so as to completely bury the silicon nitride within the crystal. Impurities are then diffused into at least a portion of the silicon within a region bounded by the sides of a resonator member to be defined, according to a predetermined pattern, so as to form areas of controlled depths of conductivity type opposite to that of the crystal. Thereafter, windows are etched in the epitaxially deposited silicon to the depth of the silicon nitride so as to define the sides of the resonator member. The silicon nitride is then completely etched away so as to form a cavity beneath the resonant member.

Accordingly, one object of the invention is to provide a method of fabricating an electromechanical filter which is compatible with modern semiconductor technology and monolithic semiconductor integrated circuitry.

Another object is to provide an electromechanical filter having an output signal which is linear in resonator strain so as to avoid harmonic generation by the filter.

Another object is to provide an electromechanical filter wherein the output circuitry does not load the input circuitry.

Another object is to provide an electromechanical filter having an output impedance level selectable from a wide range of values.

Another object is to provide an electromechanical filter having an electrical output signal transducer integral with the oscillating member so as to completely eliminate signal attenuation due to losses at resonator-transducer interfaces.

Another object is to provide a method of fabricating complex geometrical configurations required in electromechanical filters of a wide range of electrical characteristics.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGS. 9–14 illustrate steps in fabrication of a second embodiment of the invention;

FIG. 14 is a top view of the second embodiment of the invention, including an illustration of input circuitry for driving the filter thereof;

DESCRIPTION OF THE PREFERRED EMBODIMENTS

Figures 1, 2, 3, 4, 5, 6, 7, 8A, 8B, 8C:
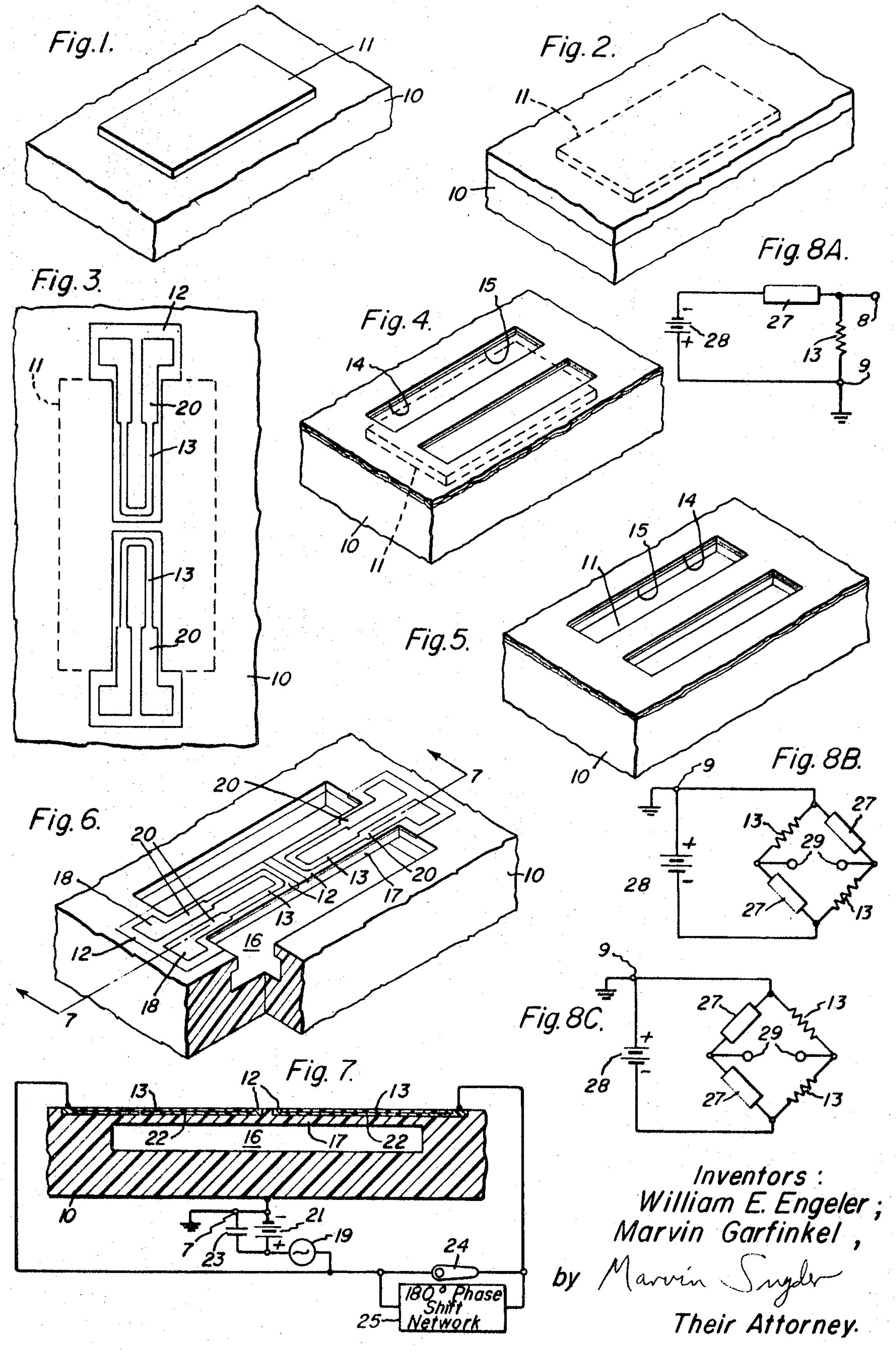
FIGS. 1–6 illustrate steps in fabrication of a first embodiment of the invention.
FIG. 7 is a cross-sectional view of the first embodiment of the invention, including an illustration of input circuitry for driving the filter thereof.
FIGS. 8A–8C are schematic diagrams illustrating ways in which an output signal may be derived from the device on the instant invention.

Fabrication of an electrostrictively driven embodiment of the electromechanical filter of the instant invention is begun by depositing a slab of silicon nitride on a semiconductor crystal, such as silicon, of one type polarity. For illustrative purposes, the crystal is herein assumed to be of P-type polarity, although N-type crystals may be utilized in the alternative. The silicon nitride slab is of dimensions identical to those of a cavity to be formed in the crystal beneath a resonator member. Thus, as shown in FIG. 1, a P-type silicon crystal 10 has deposited on one surface thereof a slab of silicon nitride 11 of thickness at least equal to the amplitude of swing of the mechanical resonator to be formed. Although fabrication of but a single electromechanical filter is herein described, a large plurality of such devices may be fabricated simultaneously on a single crystal; hence, crystal 10 is depicted as a segment of a much larger single crystal.

Silicon nitride slab 11 is formed on crystal 10 by first depositing a layer of silicon nitride of desired thickness over an entire surface of the crystal. This may be accomplished in a furnace containing an atmosphere of $SiH_4$ and ammonia. It has been found that coatings of silicon nitride approximately 300 Angstroms thick may be produced by maintaining the crystal at a temperature of 1,000° C. for about 1 minute in this atmosphere of $SiH_4$ and ammonia. The silicon nitride layer thus formed is coated with a layer of molybdenum which may be formed by sputtering or by evaporation from a body of the material heated by an electron beam in a high vacuum system. Following employment of well-known photoresist techniques, the molybdenum is etched away with an etch such as a ferricyamide etch which includes 92 grams of $K_3Fe(CN)_6$, 20 grams of KOH and 300 grams of water; so that only that portion of the silicon nitride intended to form slab 11 remains coated with molybdenum. Additional details of this molybdenum masking process are described and claimed in Tiemann et al. application Ser. No. 606,242, filed Dec. 30, 1966, and assigned to the instant assignee. The unmasked silicon nitride is thereafter etched by application of 48 percent HF thereto at a rate of about 100 Angstroms per minute or more depending upon the reaction temperature, as described in the aforementioned Tiemann et al. application. After etching the silicon nitride layer, the remaining photoresist material may be removed by wiping with trichlorethylene or other materials for this purpose, and the molybdenum layer may be removed by etching with the ferricyanide etch previously described. At this juncture, the device configuration is as illustrated in FIG. 1.

The same type conductivity silicon, which is here assumed to the P-type silicon, is next grown over crystal 10 so as to cover the entire slab 11 of silicon nitride by employment of the iodine epitaxy process as described and claimed in E. A. Taft application Ser. No. 636,911, filed May 8, 1967, and assigned to the instant assignee. At this point, the device comprises wafer 10 enlarged to contain a buried island 11 of silicon nitride, as illustrated in FIG. 2. The thickness of the epitaxially deposited silicon should be such as to provide the desired resonant frequency for the resonator member of the electromechanical filter, and may be adjusted by mechanical polishing as required.

As an alternate process for arriving at the structure of FIG. 2, a silicon crystal is prepared, having both sides flat and parallel. A thick layer of silicon nitride is deposited thereon and shaped by etching, in the manner previously described. A layer of silicon is next grown on top of the silicon nitride by the aforementioned iodine epitaxy process described in E. A. Taft application Ser. No. 636,911, or by either of the well-known processes of thermal decomposition of silane or hydrogen reduction of trichlorosilane. This layer of silicon is typically in the order of 10 mils in thickness and is single crystal over the areas not covered by the silicon nitride. The area over the silicon nitride may be either entirely monocrystalline or partly monocrystalline and partly polycrystalline. The grown region is then mechanically lapped so that a wafer of uniform thickness results. The single crystal beneath the silicon nitride layer is thereafter reduced in thickness by mechanical polishing or by chemical etching to the desired thickness, which corresponds to the thickness of the resonator. The wafer is then turned over and the fabrication process proceeds in the same manner as that utilized with the wafer having single crystal overgrowth, with the subsequent steps being performed on the lower surface of reduced thickness.

Wafer 10 may next be run through any and all of the standard oxidation, masking and diffusion processes in order to produce any integrated circuit desired in those regions of the wafer which do not have buried silicon nitride underneath. At this juncture, any external circuitry, the resistive output, and the necessary internal resonator driving means may be formed by conventional techniques. Thus, as shown in the top view illustration of FIG. 3, impurities which render the conductivity type opposite to that of crystal 10 are diffused into regions 12 of the crystal. Assuming the crystal to be P-type silicon, these impurities comprise donors, such as phosphorus, arsenic or antimony, deposited over an area of sufficient width to include the entire resonator member. Moreover, since the output resistor of the flexor is to comprise P-type material, the donor impurities are diffused so that the longitudinal axis of the resistor may be along the <111> axis of the crystal allowing the resulting flexor to display a gauge factor of approximately 180. Alternatively, if the output resistor of the flexor is to be of N-type material, the long axis of the flexor is preferably selected along a <100> axis. The gauge factor in such instance is approximately 130.

Following diffusion of the N-type impurities into regions 12, P-type impurities such as boron, aluminum, gallium or indium are diffused into regions 12 in accordance with U-shaped patterns 13. The U-shaped patterns are shown with widened regions 20 which, by virtue of their greater area, serve as low-resistance paths to the narrow portions of the U-shaped patterns. Alternatively, each low-resistance region may be of the same width as the remainder of the U-shaped region of which it is a part, but of greater depth to accomplish the same result, which is that strain sensitivity is essentially achieved only in the narrow or shallow diffused regions of the U-shaped patterns. The entire upper surface of crystal 10 is thereafter coated with silicon nitride by the process previously described, and the silicon nitride by the process previously described, and the silicon nitride layer in turn is coated with molybdenum in the manner described in the aforementioned Tiemann et al. application. By use of photoresist techniques, the molybdenum layer is etched away with the aforementioned ferricyanide etch for example, according to a dual window pattern which will leave a member bridging the region occupied by silicon nitride slab 11. The silicon nitride layer underlying this dual window pattern is etched down to the level of the silicon with 48 percent HF as previously described. This results in the structure shown in FIG. 4 wherein molybdenum layer 14 and silicon nitride layer 15 are exposed to view through the etched dual window regions. The silicon thereby exposed is etched as by "white etch" which comprises a mixture of approximately 3.3 parts nitric acid and 1 part hydrofluoric acid, down to the upper level of silicon nitride slab 11, as shown in FIG. 5. Any remaining photoresist material is then removed by use of trichlorethylene, for example, and molybdenum layer 14 is removed with the ferrocyanide etch, for example. The remaining silicon nitride is then removed by etching in 48 percent HF as previously described, resulting in the structure illustrated in FIG. 6, wherein N-type conductivity regions 12 and P-type conductivity regions 13, both of which may preferably extend over the resonator support regions of crystal 10, are again exposed to view. In addition, a cavity 16 now remains where formerly silicon nitride slab 11 and been situated. This structure, therefore, results in a flexor beam 17 bridging cavity 16.

U-shaped regions 13, the narrow or shallow diffused portions of which may function as piezoresistive strain-sensitive elements, include tab regions 18 at either end thereof. Measurement of resistance of either of elements 13 by making ohmic contact to the tabs 18 at either end of flexor beam 17 be thermocompression bonding, for example, provides an output signal proportional to amplitude of vibration of the beam at the frequency of vibration of the beam. Hence, each pair of tabs 18 represents a pair of output terminals for the device. Although tabs 18 are shown for convenience as output terminals, they need not necessarily comprise output terminals since the diffusion thereof, which in this embodiment comprises two diffusions, may be extended outward on the wafer to contact regions thereon in which integrated circuitry has been fabricated. As another alternative, contact to other regions on the wafer may be made by metallization, which can be accomplished by overlying tabs 18 as well as the remainder of the upper surface of the wafer with an insulator such as silicon dioxide, etching through the silicon dioxide layer to tabs 18 and to other regions of the wafer where desired contact is to be made, and depositing a layer of metal such as aluminum over the insulating layer so as to enable the metal to contact the tabs. The diffused output tab regions of other embodiments described infra may be contacted in similar fashion.

FIG. 7 illustrates means for driving the electrostrictively driven embodiment of the electromechanical filter of the instant invention, showing a sectional view of crystal 10 taken along lines 7—7 of FIG. 6. As indicated schematically, an AC input signal source 19 is connected in series with a DC power supply 21 to N-type regions 12 of flexor beam 17 and to the P-type material of crystal 10, which is grounded at a terminal 7. P-N junctions 22 of beam 17 are reverse-biased as illustrated. A capacitance 23 is connected in parallel with power supply 21, in order to avoid attenuation of the input signal by the power supply.

P-N junctions 22 act as capacitors on beam 17 so that electrostrictive forces due to the internal electric field within the depletion regions of junctions 22 drive mechanical resonator 17. As illustrated in FIG. 7, driving junctions 22 are situated close to the top surface of resonator 17. Hence, the electrostrictive force in the depletion region of each of junctions 22 strains the bar asymmetrically, driving it in the flexural mode. Either the lowest or the next highest flexural mode of oscillation can be excited with the electromechanical filter configuration of FIG. 7. The lowest flexural mode is achieved by driving junctions 22 in phase, as illustrated, while the first harmonic of the resonator may be obtained by driving junctions 22 out of phase. Thus, insertion of a 180° phase shift network 25 into either of the two input circuits to N-type regions 12, as by opening a shunt short-circuiting switch 24, results in the next highest harmonic being generated by beam 17.

Those skilled in the art will recognize that not only can any desired mode be driven by judicious placement of driving P-N junctions 22, but in addition, by judicious placement, orientation and shaping of the output resistors, it is also possible to maximize the output signal while yet discriminating against unwanted harmonics. For example, in sensing the fundamental mode, the maximum strain occurs at the center of beam 17, and strain of the opposite sense occurs in the vicinity of the ends of the beam, which contain low resistivity regions 20. The small resistance change in the low resistivity regions however has negligible effect in relation to the resistance value of the high resistivity regions however, so that the device is most sensitive to strain near the center of the beam. On the other hand, the first overtone, which corresponds to a mode at the center of the beam, is also a desirable mode of oscillation, since this mode couples no net translational motion of wafer 10.

FIG. 8A illustrates one simple manner by which an output signal may be derived from the apparatus illustrated in FIGS. 6 and 7. One of the resistors represented by U-shaped piezoresistive regions 13 is connected in series with a resistance 27 of fixed ohmic value and a DC voltage source 28 having a terminal 9 which is grounded. Output signals are derived across the U-shaped piezoresistive region 13 between terminals 8 and 9. Any longitudinal strain in resonator member 17 thus strains this piezoresistive region, altering its resistive value so as to produce a different voltage amplitude thereacross. This results in an output voltage which varies in frequency and amplitude according to the frequency and amplitude of strain in member 17.

FIG. 8B illustrates another manner by which an output signal may be derived from the apparatus illustrated in FIGS. 6 and 7. Here, the resistors represented by U-shaped piezoresistive regions 13 are connected as a pair of opposite arms of a Wheatstone bridge energized by DC power supply 28 having its terminal 9 grounded. Each arm of the other pair of opposite arms of the bridge comprises a resistance 27 of fixed ohmic value. Output signals are derived across a pair of output terminals 29 connected to opposite junctions of resistance 27 and piezoresistive regions 13. Any longitudinal strain in resonator member 17 thus strains piezoresistive regions 13, altering the resistance value of each of these regions. The altered resistance values produce different voltage amplitudes across terminals 29, resulting in an output voltage which varies in frequency and amplitude according to the frequency and amplitude of strain in member 17. In the symmetrical piezoresistive configuration as illustrated in FIG. 6, the resistors change in ohmic value equally and in the same direction when the beam oscillates in its fundamental or even harmonic modes, and equally but in opposite directions when the beam oscillates in its odd harmonic modes.

In the circuit of FIG. 8B, the output signal is proportional to the algebraic sum of the changes in ohmic values of resistors 13 whereas, in the circuit of FIG. 8C, the output signal is proportional to the algebraic difference of the changes in ohmic values of resistors 13. Hence the circuit of FIG. 8B responds to the fundamental and even harmonics and discriminates against odd harmonics, while the circuit of FIG. 8C responds to the odd harmonics and discriminates against the fundamental and even harmonics. Although mechanical pickup by the resonator beam generally causes a strain pattern which is symmetric about the center of the beam, thereby producing spurious signals of equal magnitude and sign in each of resistors 13, operating the filter in its odd harmonic mode and detecting its output signal with the bridge circuit configuration of FIG. 8C thus affords protection against erroneous outputs due to mechanical pickup by the resonator beam. It should be noted that piezoresistive regions 27 are maintained at a negative potential with respect to N-type regions 12 by DC supplies 21 and 28 and grounded terminals 7 and 9. This prevents undesired forward biasing of the P-N junctions between regions 12 and 13.

In fabricating a capacitively driven electromechanical filter, a structure such as that shown in FIG. 9 is first created by coating a semiconductor wafer of one conductivity type, such as P-type silicon crystal 10, with a pair of insulating strips 30 and 31 such as silicon monoxide which may be deposited conventionally on wafer 10 through a suitable mask. After sputtering or evaporation of a pair of metallic strips 32 and 33 such as tungsten or molybdenum over strips 30 and 31 respectively, the structure of FIG. 9 results. Although for convenience a pair of metallic strips on a pair of insulating strips are described, a single metallic strip on a single insulating strip may be utilized if it is desired to drive the filter in the fundamental mode, Next, a slab of silicon nitride 34 is deposited over the upper surface of crystal 10 on which metallic strips 32 and 33 are situated, as illustrated in FIG. 10. Slab 34 is formed in a manner identical to that described for formation of slab 11 as shown in FIG. 1. The minimum thickness of slab 34, however, is measured from the upper surface of strips 32 and 33.

Following deposition of silicon nitride slab 34 on crystal 10, P-type silicon is grown over crystal 10. This overgrowth may be accomplished by employment of the iodine epitaxy process described in the aforementioned Taft application for example. The resulting structure is illustrated in FIG. 11.

At this juncture, the necessary patterns of donor and acceptor impurities are diffused into the crystal at the appropriate locations in order to provide driving and sensing means for the resonator element of the electromechanical filter. Crystal 10 is then coated with silicon nitride and masked with molybdenum in order to locate the flexor beam of the electromechanical filter. The silicon nitride is thereafter etched away, resulting in the structure illustrated in FIG. 12 wherein layer 35 comprises the molybdenum masking layer and layer 36 comprises the silicon nitride layer. Next, by use of the aforementioned white etch, the P-type silicon in the regions exposed by the openings in silicon nitride layer 36 are etched away down to the level of silicon nitride slab 34. Molybdenum layer 35 is thereafter removed by etching with the previously described ferricyanide etch for example, resulting in the structure shown in FIG. 13.

After removal of all the remaining silicon nitride regions by use of 48 percent HF, metallic strips 32 and 33 are exposed to view in a cavity 37 formed by removal of the buried island 34 of silicon nitride, as illustrated in FIG. 14. Cavity 37 is bridged by a flexor beam 38 containing N-type conductivity regions 40 which extend over the flexor beam support regions of crystal 10. A top view of the resulting structure and diffused patterns in flexor beam 38 is illustrated in FIG. 15, along with a circuit for coupling energy to the electromechanical filter from input signal source 19. Thus, source 19 applies an input voltage across metal strips 32 and 33 and P-type resonator beam 38, with ohmic contact being made to the resonator beam. A DC component is added to the input voltage by DC source 21, shunted by bypass capacitor 23 and connected in series with input signal source 19. Output signals are provided by output leads 41 which make ohmic contact to piezoresistive N-type regions 40, and may be utilized in the manner described for the apparatus of FIGS. 8A, 8B and 8C, with the exception that a DC supply is inserted between junction 9 and the ground connection thereto such that the P-N junctions between crystal 10 and resistors 40 are always reverse biased. For example, if crystal 10 is of P-type conductivity and regions 40 of N-type conductivity, then junction 9 is biased positively with respect to ground. Thus, oscillation in the fundamental mode is initiated by the varying electrostatic forces existing between metallic strips 32 and 33 and the P-type material of flexor beam 38. By use of a 180° phase shift network as illustrated in FIG. 7, oscillation at the first harmonic may be achieved.

Figure 16:
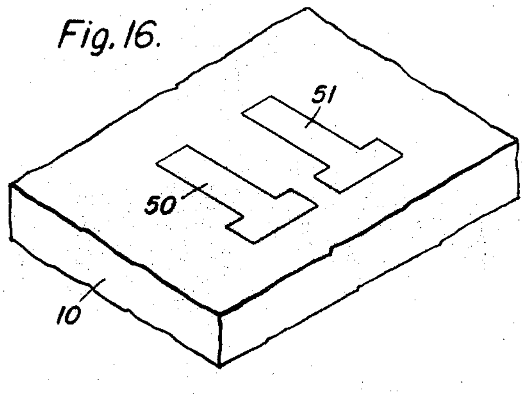
FIGS. 16–19 illustrate steps in fabrication of a third embodiment of the invention.

Another embodiment of a capacitively driven electromechanical filter may be fabricated by utilizing diffused opposite-conductivity-type regions in crystal 10 instead of strips 30–33. Thus, as illustrated in FIG. 16, a pair of N-type diffused regions 50 and 51 are formed in the upper surface of P-type crystal 10 by conventional diffusion methods. If preferred, regions 50 and 51 may be diffused outward beyond the edge of the silicon nitride slab to be formed, permitting contact to be made thereto by diffusion through the layer of silicon to be epitaxially grown over the crystal. Moreover, only a single diffused region may be utilized if desired.

Figures 17, 18:
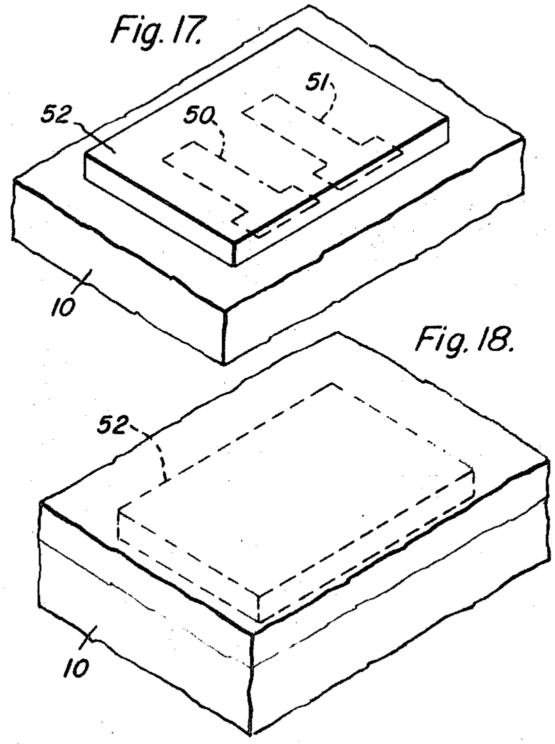

As shown in FIG. 17, a slab of silicon nitride 52 is next deposited on crystal 10 so as to cover regions 50 and 51, in the manner previously described. P-type silicon is thereafter epitaxially grown onto crystal 10, so as to completely engulf and bury slab 52, as illustrated in FIG. 18.

Figures 19, 20, 22:
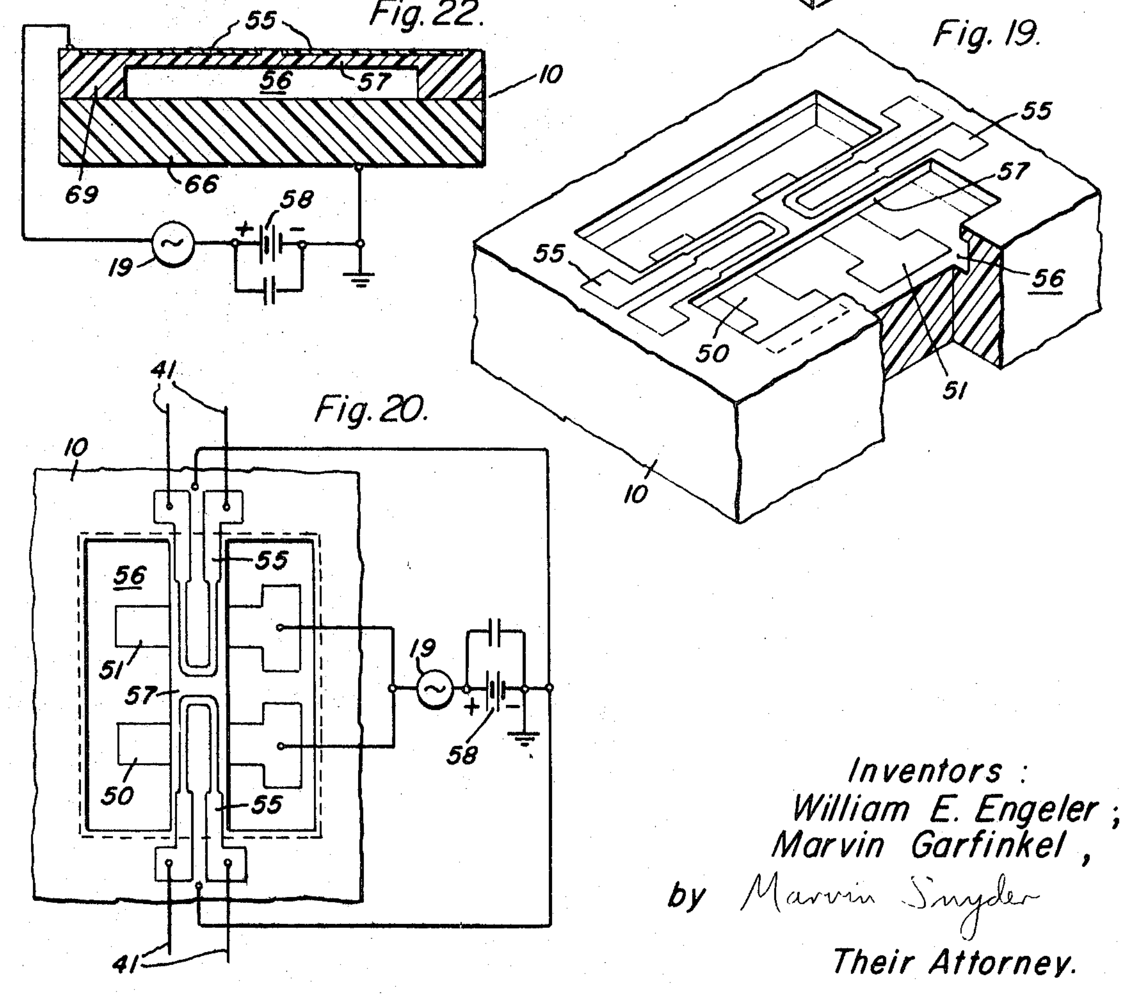
FIG. 20 is a top view of the third embodiment of the invention, including an illustration of input circuitry for driving the filter thereof.
FIG. 22 is a cross-sectional view of a fifth embodiment of the invention.

The patterns of piezoresistive regions, as shown in FIG. 19, are then diffused into the top surface of crystal 10 as previously described, forming N-type regions 55. After the steps of coating the crystal first with silicon nitride and then with molybdenum, and thereafter etching first the molybdenum and then the silicon nitride, the pattern for etching the crystal is formed. The crystal is then etched and slab 52 of FIG. 18 is next etched away, resulting in a cavity 56 formed beneath and on either side of flexor beam 57 which bridges the cavity. The resulting structure is illustrated in FIG. 19.

As illustrated in FIG. 20, the electromechanical filter is driven from input signal source 19 in a manner substantially identical to that described for the apparatus of FIG. 15. However, one side of signal source 19 is in ohmic contact with N-type regions 50 and 51. The opposite side of signal source 19 is in ohmic contact with P-type resonator 57. Thus, flexor beam 57 is driven by the electrostatic forces existing between N-type regions 50 and 51 beneath the flexor beam and the P-type material of the flexor beam itself, in a manner similar to that described for the apparatus of FIG. 15. A reverse bias from a DC supply 58 is applied across the junctions between regions 50 and 51 and the remainder of crystal 10 in order to maintain the resistivity of these junctions at a high level. Output signals are supplied from ohmic contacts to piezoresistive regions 55 across either or both pairs of output leads 41, and may be utilized as illustrated in FIGS. 8A, 8B and 8C with appropriate biases to reverse bias the P-N junctions between resistors 55 and crystal 10, in the manner previously described.

Figure 21:
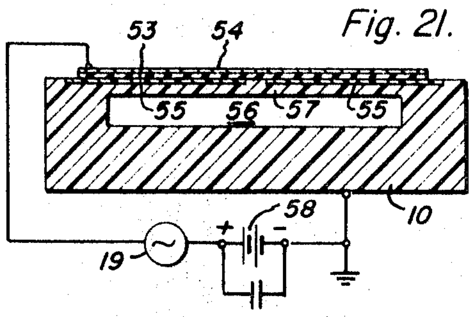
FIG. 21 is a cross-sectional view of a fourth embodiment of the invention.

Another version of a capacitively driven embodiment of the electromechanical filter is illustrated in a lengthwise cross section view in FIG. 21. In this embodiment, flexor beam 57 has diffused therein opposite conductivity type piezoresistive regions 55 which are U-shaped as illustrated in FIG. 20. Beam 57 is overlaid with a deposit of insulating material such as silicon dioxide 53, which is then coated with a metallic film 54 which may be, for example, molybdenum or aluminum, or combinations of chromium superimposed with layer of copper, silver or gold. Beam 57 is thus electrostrictively driven by application of an input signal from signal source 19 in series with capacitively bypassed DC bias source 58 across beam 57 and oxide layer 53. Output contacts to piezoresistive regions 55 may be made in the manner previously described.

Still another version of a capacitively driven embodiment of the electromechanical filter is illustrated in a lengthwise cross section view in FIG. 22. In this embodiment, crystal 10 is formed of one conductivity type semiconductor, such as P-type 66, and an opposite conductivity type region such as N-type region 69. Regions 55 are diffused into beam 57 in the manner previously described. The beam is driven by application of an input signal from signal source 19 in series with capacitively bypassed DC bias source 58 across cavity 56. Because the resistance of the reverse biased P-N junction between regions 66 and 69 is high, substantially all the applied voltage appears across the cavity. Output contacts to piezoresistive regions 55 again may be made in the manner previously described.

Figure 23:
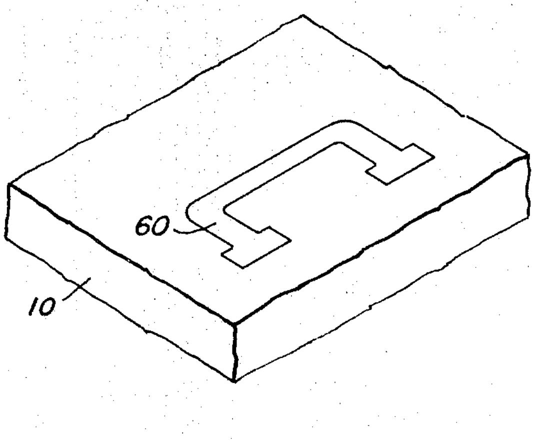
FIGS. 23 and 24 illustrate steps in fabrication of a sixth embodiment of the invention.

An electromagnetically driven embodiment of the filter of the instant invention may be fabricated by diffusion of donor impurities into P-type silicon crystal 10, so as to form an N-type region 60 as illustrated in FIG. 23, with a longitudinal component directed in the same direction as the longitudinal axis of the flexor beam to be fabricated. Alternatively, region 60 may comprise a metallic conductor sputtered or evaporated onto an insulating layer comprised, for example, of silicon monoxide. A silicon nitride slab 61 may next be deposited onto crystal 10 so as to cover region 60, as illustrated in FIG. 24.

Figure 24:
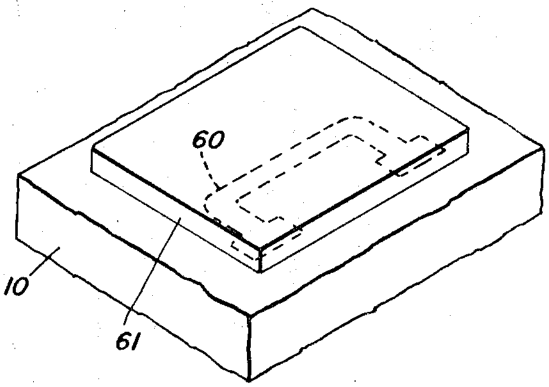
Figures 25, 26:
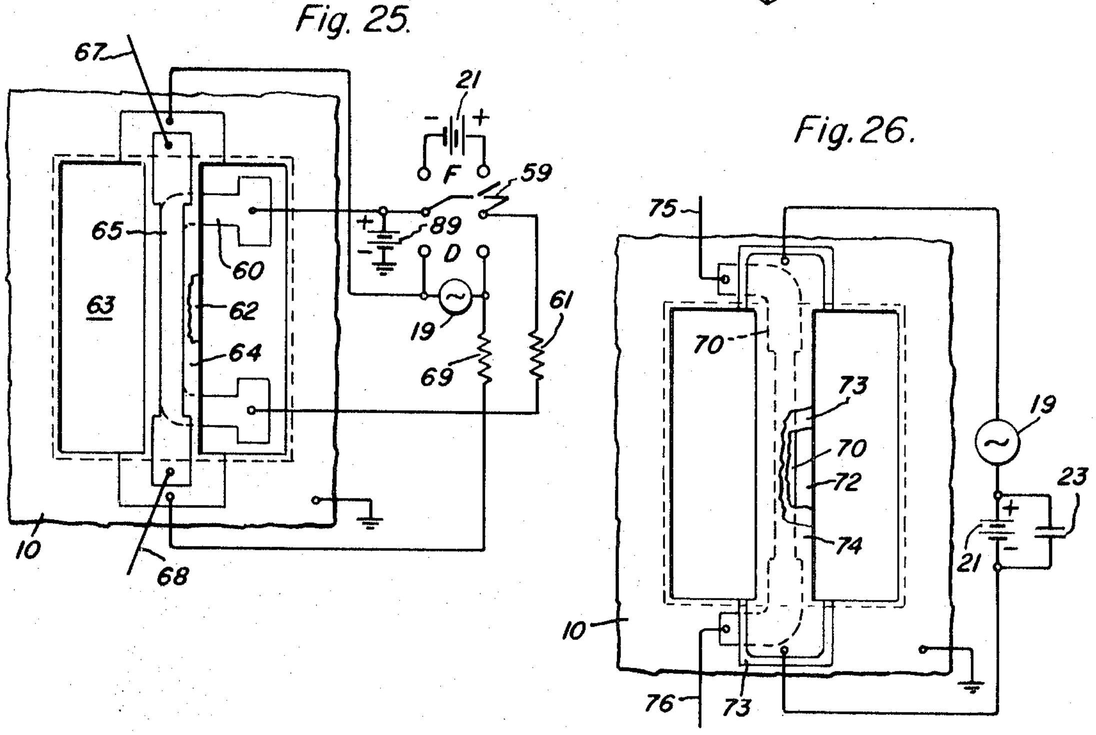
FIG. 25 is a top view of the sixth embodiment of the invention, including an illustration of input circuitry for driving the filter thereof.
FIGS. 26 and 27 represent top views of additional embodiments of the invention.

The device of FIG. 24 is next processed in the manner previously described, so that slab 61 is buried in an epitaxially formed region of crystal 10. A strip of diffused N-type impurities is thereafter formed longitudinally along the upper surface of crystal 10, directed to coincide with the resonator beam to be formed, and a piezoresistive P-type region to act as a strain sensor is diffused into the N-type region in the manner previously described. Following the etching steps previously described, the resulting structure appears, from a top view standpoint, as illustrated in FIG. 25 wherein a resonator 62 bridges a gap 63 in crystal 10. Diffused N-type conducting element 64 is directed along the longitudinal axis of resonator element 62, as is piezoresistive P-type region 65, which is diffused into N-type region 64 in the manner previously described.

As illustrated in FIG. 25, with a switch 59 in position F, a bias current is supplied from DC source 21 to N-type region 60 in series with a current-limiting resistance 61. The P-N junction between crystal 10 and region 60 is reverse biased by DC supply 89 to maintain a high impedance thereof. In addition, the signal from AC signal source 19 is furnished through a current-limiting resistance 69 to N-type region 64 which, in this embodiment, is diffused along the entire length of resonator beam 62. Elements 60 and 64 are thus energized to drive the beam at its fundamental frequency and hence the filter provides an output signal of frequency equal to that of source 19.

Instead of diffused regions, the device of FIGS. 23–25 may be fabricated with metallic regions deposited on insulating regions. Thus, diffused region 60 may comprise molybdenum evaporated onto an evaporated layer of silicon monoxide, while region 64 may comprise a silicon monoxide layer evaporated onto beam 62 over piezoresistive region 65 and overlaid with an evaporated metallic film such as molybdenum. As a further alternative, a high-permeability metal may be substituted for the metal on either or both of regions 60 and 64 in order to increase the magnetic coupling therebetween.

Bias source 21 of FIG. 25 is necessary in order to produce an output signal at the input frequency. If this bias source is omitted, as by throwing switch 59 to position D, the signal from source 19 is applied to region 60 and the device acts as a frequency doubler since the force now acting on beam 62 is independent of the direction of current flow from source 19. Hence, if the mechanical resonant frequency is a frequency $f_0$, then the output signal frequency is $f_0$ when the input frequency of signal source 19 is $\frac{1}{2}f_0$.

Because of the relatively high conductivity of conducting regions 60 and 64, the input impedance to the electromechanical filter of FIG. 25 is low. Output signals produced by the electromechanical filter of FIG. 25 may be obtained by making ohmic contact with output leads 67 and 68 to piezoresistive element 65. As is also possible with the embodiments previously described, output signals may be obtained from the aforementioned piezoresistive element in the manner illustrated in FIG. 8A regardless of whether switch 59 is in the F or D position. It should be noted that operation of this device as a frequency doubler can be highly advantageous since microphonics are isolated; that is, the resonator is mechanically decoupled from signal frequencies $\frac{1}{2}f_0$.

FIG. 26 shows another embodiment of the electromechanical filter of the instant invention wherein a diffused piezoresistive region 70 is situated within resonant member 72 of crystal 10 and is of conductivity type opposite to that of the silicon of wafer 10. A coating of insulator, such as silicon monoxide 73, is formed on resonant member 72 in order to avoid short circuiting of piezoresistive region 70, and a film of magnetostrictive metal 74, preferably a metal with high permeability such as permalloy or supermalloy, is deposited on insulating material 73. Output leads 75 and 76 are attached to piezoresistive region 70, making ohmic contact thereto. When driven by a signal from AC signal source 19 in series with DC bias source 21 shunted by bypass capacitor 23, magnetostrictive material 74 drives resonant member 72 in its flexural mode at the frequency of source 19. Output signals are derived as described in conjunction with other embodiments of the invention, such as illustrated in FIG. 8A, with appropriate reverse bias applied across the P-N junction between resistor 70 and crystal 10 as explained, supra. If a DC bias is not provided however, the device acts as a frequency doubler having desirable electromechanical characteristics similar to those described in conjunction with the device of FIG. 25 when operated as a frequency doubler, since the magnetrostrictive drive produces a quadratic response.

Figure 27:
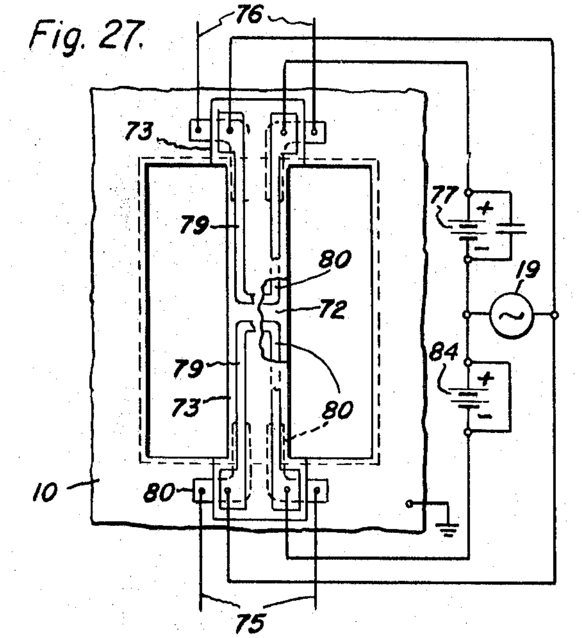

Still another embodiment of the electromechanical filter of the invention is illustrated in FIG. 27 wherein a pair of regions of U-shaped magnetrostrictive material 79 are overlaid on a layer of insulation 73, such as silicon monoxide, so as to cover each half of the length of resonant member 72. This filter is driven by application of an input signal to both regions 79 from signal source 19 through capacitively bypassed, oppositely poled DC bias sources 77 and 84, thereby driving resonant member 72 at the first harmonic of the resonator, which is equal to the input signal source frequency. Output signals are derived across each pair of leads 75 and 76 from U-shaped piezoresistive material 80 in flexor beam 72, with appropriate reverse bias applied across the P-N junctions between resistors 80 and crystal 10, in the manner described in conjunction with the apparatus illustrated in FIGS. 8A, 8B and 8C.

Figure 28:
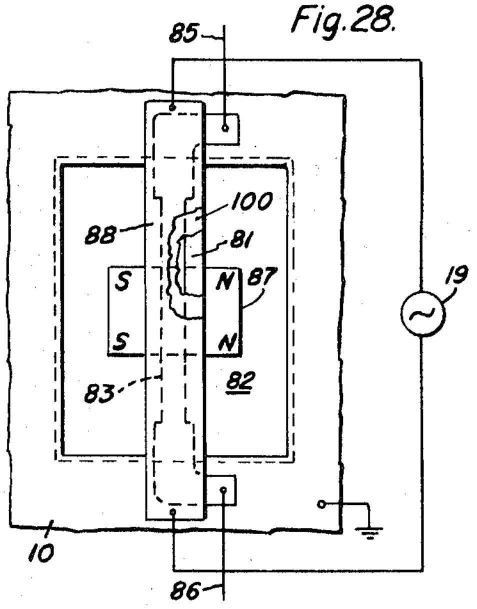
FIG. 28 is a top view of another embodiment of the invention, including an illustration of input circuitry for driving the filter thereof.

Yet another embodiment of the instant invention is illustrated in FIG. 28 wherein a metallic conductor 88 such as aluminum, or molybdenum, or combinations of chromium with copper, silver or gold superimposed thereon, is deposited on a resonator member 81 bridging a cavity 82 in crystal 10, with an insulating layer 100 such as silicon monoxide separating conductor 88 from the silicon of resonator member 81. A piezoresistive region 83 is diffused into the silicon of resonant member 81 in the previously described manner prior to formation of the silicon oxide layer thereon. Output signals are supplied from piezoresistive region 83 through a pair of output leads 85 and 86, with appropriate reverse bias applied across the P-N junction between resistor 83 and crystal 10, in the manner described in conjunction with the apparatus illustrated in FIG. 8A. AC signals are applied across conductor 88 form AC signal source 19.

Situated beneath resonant member 81 in cavity 82 is a magnetic member 87, which may comprise Alnico sputtered or evaporated onto the surface of crystal 10 and permanently magnetized after formation of cavity 82 in the previously described manner. Therefore, in operation, the alternating electromagnetic field established by current flow through conductor 88 interacts with the magnetic field of permanent magnet 87 to cause oscillation of member 81. When the input signal frequency coincides with the resonant frequency of member 81, member 81 oscillates in its fundamental mode and output signals supplied by piezoresistive region 83 are maximized.

Figures 29, 30, 31:
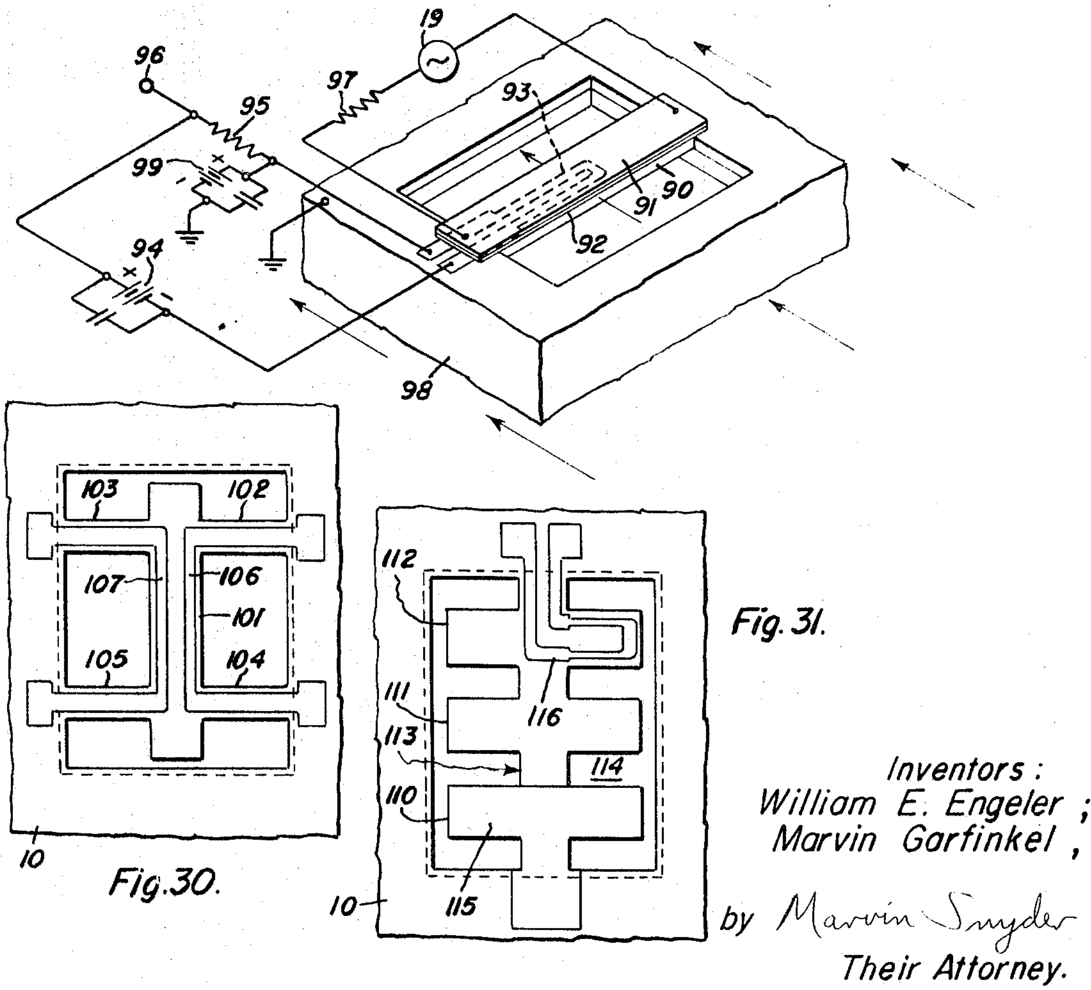
FIG. 29 is an isometric view of still another embodiment of the invention, including an illustration of input circuitry for driving the filter thereof.
FIG. 30 is a top view of a crystal configuration etched in accordance with a pattern different from that used with the other embodiments.
FIG. 31 is a top view of a band-pass filter fabricated in accordance with the instant invention.

FIG. 29 is an isometric view of still another embodiment of the invention. This embodiment is somewhat similar to that of FIG. 28 in that a resonator beam 90 carries a conducting layer such as a metallic film 91 comprised of a metal such as enumerated in conjunction with FIG. 28, deposited over an insulating material such as silicon monoxide 92, which in turn is formed on the silicon of resonator beam 90, assumed here to be of P-type conductivity, after a U-shaped region 93 of opposite conductivity type is diffused into the silicon of resonator 90 to form a piezoresistive strain sensitive element. The P-N junction thus formed in the silicon is constrained to exhibit a high impedance by a reverse bias applied thereacross from a capacitively bypassed DC supply 99. Input signals are supplied from AC input signal source 19 across metallic conductor 91 through a current limiting resistance 97, while readout is achieved by sensing voltages across bifilar piezoresistive region 93. The sensed voltages are created by application of a capacitively bypassed DC signal source 94 across piezoresistive region 93 in series with a current-limiting resistance 95. Output signals may then be monitored between output terminal 96 and ground.

Resonator 90 is situated within a constant field as produced by a permanent magnet, directed in the plane of the resonator as indicated by the arrows. This magnet is external to the electromechanical filter and may comprise, for example, the permanent magnet of a loudspeaker. Resonator beam 90 may be integral with a silicon crystal 98, as described in the previous embodiments, unlike the discrete electromechanical filter described and claimed in our copending application, Ser. No. 660,076, filed concurrently herewith and assigned to the instant assignee, which comprises a silicon beam rigidly bonded to a nonflexing base such as a ceramic body or plate. The apparatus of FIG. 29 provides a simple, low-impedance drive for resonator 90. The constant magnetic field has no detrimental influence on the elements of integrated circuitry which may be formed on wafer 10. In this embodiment of electromechanical filter, the drive is inherently linear; that is, the force driving resonator 90 is independent of resonator deflection. This, together with the linearity of the piezoresistive sensor of flexor beam 90, produces an electromechanical resonator with good filtering properties. Moreover, for external magnetic fields of reasonable amplitude, the electromechanical coupling is large. By forming this apparatus in a single crystal as previously described, the drive may be utilized where the filter is incorporated in an integrated circuit.

FIG. 30 depicts a crystal configuration which may form the basis for additional embodiments of the invention, wherein a resonator 101 is supported at points along its length where nodes exist during resonance in the flexural mode. Thus, the resonator is supported at one nodal region by one pair of crosspieces 102 and 103 and at another nodal region by a second pair of crosspieces 104 and 105. Both resonator 101 and crosspieces 102–105 are formed integral with crystal 10 in a manner similar to that previously described. The embodiment of FIG. 30 may be driven in a manner similar to that previously described, and hence contains a pair of strips 106 and 107 one of which, such as strip 106, is typically a piezoresistive region diffused into the crystal and the other of which, such as strip 107, comprises a metallic conductor deposited thereon and insulated therefrom. The strips may be terminated on the support portion of crystal 10, in which case electrical contact may be made thereto. Alternatively, the strips may be continued over the crosspieces in the manner illustrated. Fabrication of this configuration is performed in a manner similar to that previously described, using the pattern illustrated in FIG. 30 for etching the epitaxially grown silicon on crystal 10. Electromechanical energy may be furnished to resonator 101 through strip 107 as described for the previous embodiments.

FIG. 31 is a top view of a multielement band-pass filter constructed in accordance with the instant invention. This filter is formed in the manner described supra, but with a differently patterned resonator means which comprises a plurality of resonators 110, 111 and 112 emanating from a central stem 113 bridging a cavity 114 in crystal 10. Resonator 110 may be driven according to any convenient means previously described. For example, the filter may be formed of a crystal of one conductivity type, such as P-type. Thus, in the fabrication process, after a P-type region has been epitaxially grown over the silicon nitride slab in the manner previously described, the lower region is reduced to the desired thickness by lapping or otherwise. A region of N-type conductivity is diffused into the portion of the crystal where resonator 110 is to be formed. The subsequent steps of masking and etching are performed on the surface of reduced thickness, or lower surface of the original crystal, resulting in the device of FIG. 31 wherein regions 115 and 116 are of N-type conductivity and the remainder of the device is of P-type conductivity. An AC voltage with a DC bias is then applied across region 115 and the remainder of the device capacitively drives resonator 110 into oscillation. This oscillation is mechanically coupled through stem 113 to resonator 111, which is consequently driven into oscillation and thereby widens the pass band of the filter in a manner well known in the art. Similarly, resonator 112 is also driven into resonance by virtue of its mechanical coupling to resonators 110 and 111, thereby widening the pass band yet further. Additional resonators could be added if desired, so as to still further enlarge the pass band. Output of the filter is provided by a U-shaped piezoresistive region 116 of N-type conductivity diffused into one-half the length of resonator 112.

The foregoing describes a method of fabricating an electromechanical filter which is compatible with modern semiconductor technology and monolithic semiconductor integrated circuitry. The output signal is linear in resonator strain, thereby avoiding harmonic generation by the filter itself. The output circuitry of the filter does not load the input circuitry, and the output impedance level may be selected from a wide range of values. Moreover, the electromechanical filter of the instant invention completely eliminates signal attenuation due to losses at resonator-transducer interfaces by requiring that the electrical output signal transducer be integral with the oscillating member of the filter. Resonant structures of any desired complexity may be fabricated by changing the pattern etched into the semiconductor crystal.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

We claim:

1. An electromechanical filter compatible with monolithic integrated circuitry comprising:

a semiconductor crystal having a cavity formed therein; semiconductor resonator means integral with said crystal and bridging said cavity; means drivably coupled to said resonator means for furnishing mechanical energy to said resonator means; and piezoresistive output means integral with a surface portion of said resonator means and responsive to oscillation of said resonator means for producing a signal of amplitude and frequency respectively proportional to the amplitude and frequency of oscillation of said resonator means.

2. The electromechanical filter of claim 1 wherein said means for furnishing mechanical energy to said resonator means comprises a P-N junction directed along the longitudinal axis of said resonator means and means for applying an input voltage across said junction.

3. The electromechanical filter of claim 1 wherein said semiconductor crystal including said resonator means is of one conductivity type, said means for furnishing mechanical energy to said resonator means comprises a first P-N junction formed at the interface of said resonator means with an opposite conductivity type region therein, and said piezoresistive output means comprises a region of said one conductivity type formed within said opposite-conductivity-type region.

4. The electromechanical filter of claim 3 wherein said semiconductor crystal of one conductivity type comprises P-type silicon, said opposite conductivity type is N-type silicon, and the longitudinal axis of said piezoresistive output means is directed along a <111> crystallographic axis.

5. The electromechanical filter of claim 3 wherein said semiconductor crystal of one conductivity type comprises N-type silicon, said opposite conductivity type is P-type silicon, and the longitudinal axis of said piezoresistive output means is directed along a <100> crystallographic axis.

6. The electromechanical filter of claim 1 wherein said means for furnishing mechanical energy to said resonator means comprises conductive means situated near said resonator means but spaced apart therefrom by sufficient distance to avoid physical contact with said resonator means when said resonator means is in its resonant condition, and means applying an input voltage across said conductive means and said resonator means.

7. The electromechanical filter of claim 6 wherein said conductive means comprises a metallic region adherent to said crystal in the base of said cavity.

8. The electromechanical filter of claim 6 wherein said semiconductor crystal is of one conductivity type and said conductive means comprises a region of opposite conductivity type formed in the base of said cavity.

9. The electromechanical filter of claim 6 wherein said semiconductor crystal comprises P-type silicon and the longitudinal axis of said piezoresistive output means is directed along a <111> crystallographic axis.

10. The electromechanical filter of claim 6 wherein said semiconductor crystal comprises N-type silicon and the longitudinal axis of said piezoresistive output means is directed along a <100> crystallographic axis.

11. The electromechanical filter of claim 1 wherein said means for furnishing mechanical energy to said resonator means comprises first conductive means directed parallel to said resonator means and situated near said resonator means but spaced apart therefrom by sufficient distance to avoid physical contact with said resonator means when said resonator means is in its resonant condition, second conductive means situated on said resonator means but electrically isolated therefrom; means furnishing input signal current to said first conductive means; and means furnishing additional input signal current to said second conductive means.

12. The electromechanical filter of claim 11 wherein said semiconductor crystal comprises P-type silicon with the longitudinal axis of said piezoresistive output means directed along a <111> crystallographic axis, said first conductive means being situated at the base of said cavity but electrically isolated therefrom and comprising one of the group consisting of an N-type region of said crystal and a metallic film, and said second conductive means comprising one of the group consisting of an N-type region of said crystal and a metallic film.

13. The electromechanical filter of claim 11 wherein said semiconductor crystal comprises N-type silicon with the longitudinal axis of said piezoresistive output means directed along a <200> crystallographic axis, said first conductive means being situated at the base of said cavity but electrically isolated therefrom and comprising one of the group consisting of a P-type region of said crystal and a metallic film, and said second conductive means comprising one of the group consisting of a P-type region of said member and a metallic film.

14. The electromechanical filter of claim 11 wherein said second conductive means is situated over the entire length of said resonator means.

15. The electromechanical filter of claim 11 wherein said second conductive means is situated over a portion of the entire length of said resonator means.

16. The electromechanical filter of claim 1 wherein said means for furnishing mechanical energy to said resonator means comprises a film of magnetostrictive metal situated over the entire length of said resonator means, and means furnishing an input current through the entire length of said film.

17. The electromechanical filter of claim 1 wherein said means for furnishing mechanical energy to said resonator means comprises two pairs of substantially parallel strips of magnetostrictive metal, each of said pairs being situated over substantially one-half the length of said resonator means and being joined at the approximate center of the length of said resonator means, and means applying an input signal across the unjoined ends of each pair of said strips.

18. The electromechanical filter of claim 1 wherein said means for furnishing mechanical energy to said resonator means comprises conductive means situated on said resonator means, permanent magnet means adhered to said crystal in the base of said cavity, and means furnishing input signal current to said conductive means.

19. The electromechanical filter of claim 1 wherein said means for furnishing mechanical energy to said resonator means comprises conductive means situated on said resonator means, constant magnetic field producing means situated externally to said crystal, and means furnishing input signal current to said conductive means, said constant magnetic field being directed such that at least a component thereof is perpendicular to the direction of current flow through said conductive means.

20. The electromechanical filter of claim 19 wherein said constant magnetic field producing means comprises a permanent magnet.

21. The electromechanical filter of claim 19 wherein said piezoresistive means integral with said resonator means is of bifilar configuration.

22. The electromechanical filter of claim 1 wherein said means for furnishing mechanical energy to said resonator means comprises a layer of insulator means coating the upper surface of said resonator means, a film of metal coating said layer of insulator means, and means applying an input signal across said resonator means and said film of metal.

23. The electromechanical filter of claim 1 wherein the semiconductor of said crystal is of one conductivity type, the semiconductor of said resonator means integral with said crystal is of opposite conductivity type, and said means for furnishing mechanical energy to said resonator means comprises means applying an input signal across the junction between said opposite-conductivity-type regions.

24. The electromechanical filter of claim 23 wherein said semiconductor of said resonator means comprises P-type silicon and the longitudinal axis of said piezoresistive output means is directed along a <111> crystallographic axis.

25. The electromechanical filter of claim 23 wherein said semiconductor of said resonator means comprises N-type silicon and the longitudinal axis of said piezoresistive output means is directed along a <100> crystallographic axis.

26. The electromechanical filter of claim 1 wherein said resonator means comprises a stem having a plurality of cantilevered mechanical resonators extending therefrom, said means for furnishing mechanical energy to said resonator means being drivably coupled to at least one of said cantilevered mechanical resonators, and said output means comprises a piezoresistive region formed within another one of said cantilevered mechanical resonators.

27. The electromechanical filter of claim 1 including conductive means for coupling said piezoresistive output means and said drivably coupled means to said integrated circuitry, said conductive means being disposed across a face of said crystal.